United States Patent [19]

Reichow et al.

[11] 4,102,031

[45] Jul. 25, 1978

[54] METHOD OF INSTALLING A TRANSDUCER ON A STRUCTURAL MEMBER

[75] Inventors: Keith W. Reichow, Renton; David C. English, Seattle; Jerry L. McCauley, Renton, all of Wash.

[73] Assignee: Structural Instrumentation, Inc., Tukwila, Wash.

[21] Appl. No.: 749,348

[22] Filed: Dec. 10, 1976

Related U.S. Application Data

[62] Division of Ser. No. 615,827, Sep. 29, 1975, Pat. No. 4,042,049.

[51] Int. Cl.² .............................................. B23Q 3/00
[52] U.S. Cl. .................................. 29/464; 29/526 R; 248/19
[58] Field of Search ................. 29/464, 467, 468, 526; 177/137, 136, 211; 248/19; 73/141 A, 88.5; 338/6

[56] References Cited

U.S. PATENT DOCUMENTS

| | | | |
|---|---|---|---|
| 1,893,699 | 1/1933 | Dunning | 29/464 |
| 2,923,540 | 2/1960 | Yost et al. | 177/137 |
| 3,010,529 | 11/1961 | Marion et al. | 177/136 X |
| 3,036,375 | 5/1962 | Schlasser et al. | 29/467 |
| 3,096,781 | 7/1963 | Raidt | 248/19 X |
| 3,534,461 | 10/1970 | Luketa | 29/464 |
| 3,599,479 | 8/1971 | Kutsay | 338/6 X |
| 3,661,220 | 5/1972 | Harris | 177/136 |
| 3,780,817 | 12/1973 | Videon | 177/211 X |

*Primary Examiner*—Charlie T. Moon
*Attorney, Agent, or Firm*—Seed, Berry, Vernon & Baynham

[57] ABSTRACT

A load measuring system for a tandem-wheeled vehicle. The tandem axles of the vehicle engage opposite ends of two transversely spaced equalizing beams having their midpoints pivotally supporting the vehicle. Deflections of the equalizing beams and front axle, responsive to loading of the vehicle, are sensed by a load cell transducer mounted on each equalizing beam and on the front axle. An amplifying circuit receives the transducer outputs and drives a load indicator. The load indicator provides a visual indication of front and rear wheel axle loading with respect to a preset maximum load point.

4 Claims, 9 Drawing Figures

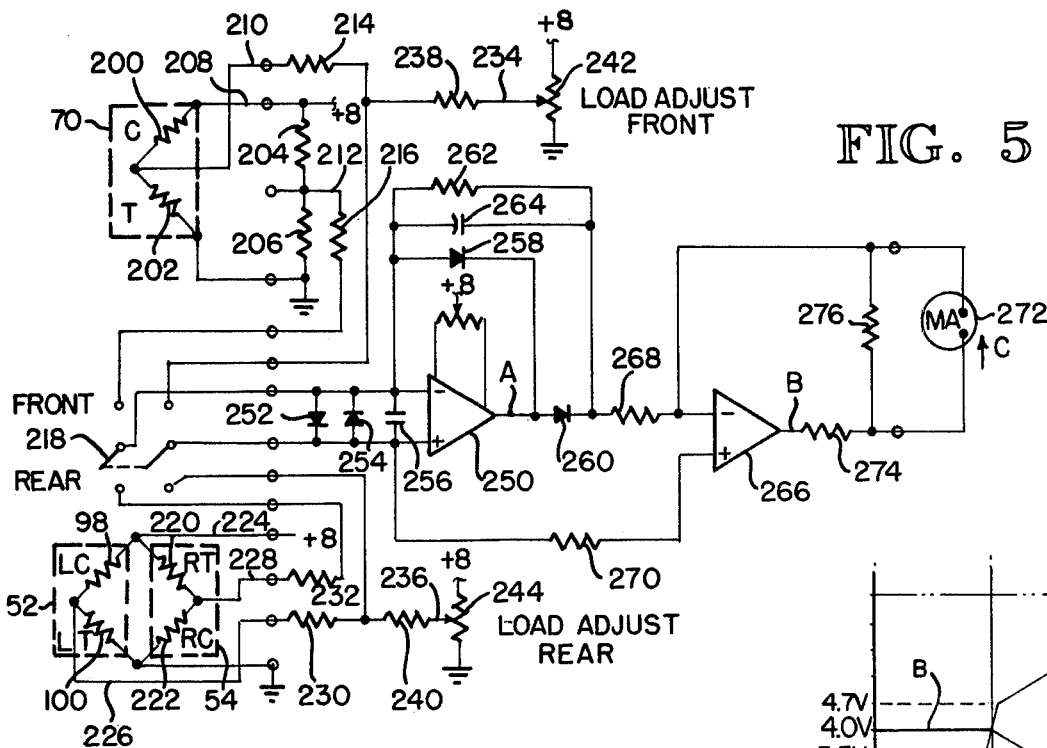
FIG. 5
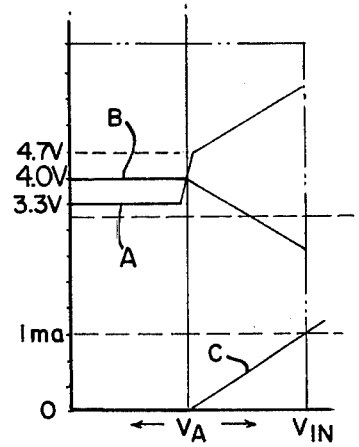
FIG. 6
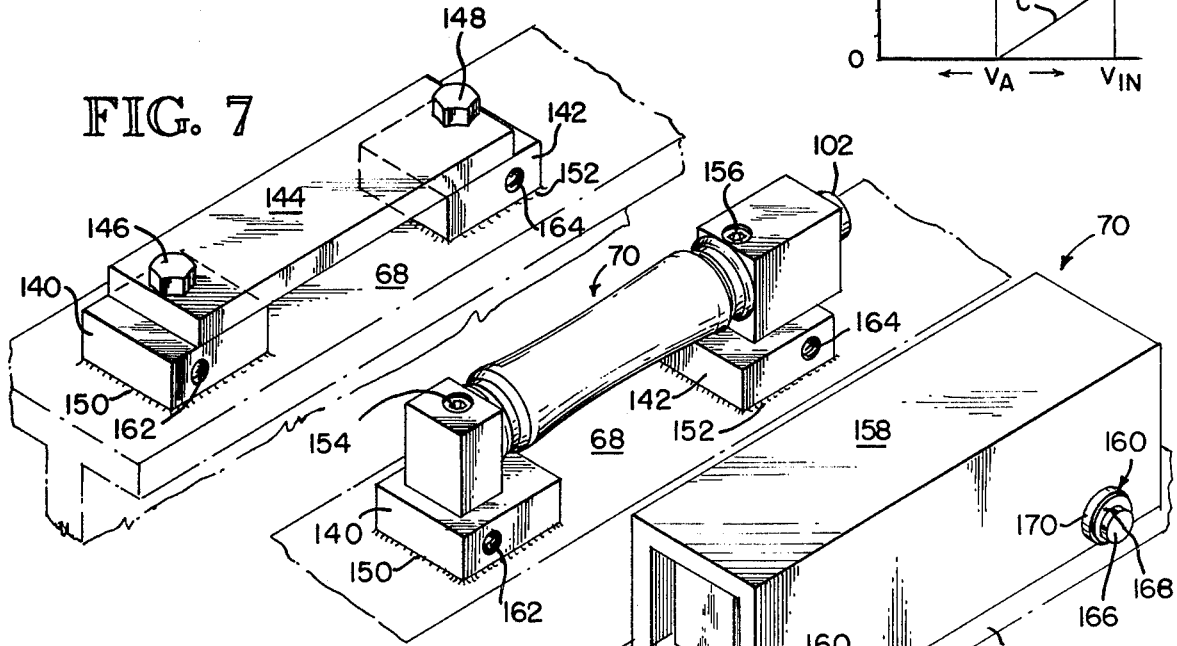
FIG. 7
FIG. 8
FIG. 9

METHOD OF INSTALLING A TRANSDUCER ON A STRUCTURAL MEMBER

This is a division of application Ser. No. 615,827, filed Sept. 29, 1975, now U.S. Pat. No. 4,042,049.

BACKGROUND OF THE INVENTION

1. Field of the Invention

This invention relates to systems for measuring the load carried by vehicles and, more particularly, to a measuring system having strain sensing devices mounted on vehicle suspension members for measuring deflection of the members responsive to loading of the vehicle.

2. Description of the Prior Art

Weight regulations limiting the loaded weights of commercial vehicles are almost universally in effect. These regulations generally specify the maximum load of each vehicle axle as well as the maximum total load. Fines are usually levied against operators who are found violating these regulations.

To maximize profits, vehicle operators normally load their vehicles as close as possible to the legal load limit. In order to do this, the vehicle operator must be able to accurately measure the vehicle's weight while the vehicle is being loaded.

A device commonly used to weigh vehicles is the platform scale. The operator drives his vehicle onto a platform, and the weight of the vehicle and its load, known as the gross weight, is measured. The weight of the load is then determined by subtracting the weight of the unloaded vehicle, known as the tare weight, from the measured value. The weight on each axle may be determined by moving the vehicle until only the axle to be measured rests on the platform. A serious disadvantage of platform scales is their frequent unavailability when the vehicle is being loaded. Where the vehicle is not resting on the platform during loading, the operator must estimate the load placed on his vehicle. Only after the vehicle has been driven from the loading area to the weighing area does the operator learn the exact weight of his load. If the estimate is too low, the vehicle must return to the loading area, where part of the load is removed. If the estimate is too high, the vehicle must either return to the loading area or make a trip at a reduced profit.

The aforementioned disadvantage of platform scales has been eliminated somewhat by using portable scales placed under each wheel. Such scales must be carried from place to place by the vehicle, and although the scales are relatively portable, their weight and bulk reduce the load capacity of the vehicle. Further, it is often somewhat difficult and time-consuming to place these scales beneath the wheels of the vehicle.

To eliminate the aforementioned problems, on-board vehicle weighing systems have been developed. In these systems, strain gauges are generally secured to structural members of the vehicle, usually the axles. However, strain gauges placed on tandem axles to measure loading are inherently inaccurate. This is because axle bending is a function of how the tires meet the vehicle supporting surface. For a given load, axle deformation, and hence the measured load, is greater where the vehicle's weight is concentrated at the outside edges of the tire. Since the interface between the vehicle's tires and the tire supporting surface is not generally well defined, it is impossible to control the measurement accuracy of these systems.

Other on-board load measuring systems utilize load cells placed on structural members intermediate the axles and the load. However, these systems also have shortcomings. For example, they are difficult to retrofit on existing vehicles and cannot sense the extra weight added to a vehicle by dirt and other debris collected on the surfaces of the vehicle suspension beneath the load cells.

Other on-board load measuring systems measure the relative displacement of the springs or the relative displacement between the vehicle frame and axle. However, the accuracy of these devices is adversely affected by wear, friction and debris, and installation thereof generally requires relatively extensive modification of the vehicle.

SUMMARY OF THE INVENTION

It is an object of this invention to provide an on-board load measuring system which accurately measures the weight placed on the axles of a tandem-wheeled vehicle.

It is another object of this invention to perform this measurement at a point in the chain of load supporting structures which is relatively close to the vehicle supporting surface.

Still another object of this invention is to provide a measuring system which is effected very little by wear, friction or road dirt.

It is a further object of this invention to provide a load measuring system which requires minimal modifications to the vehicle, thus making installation of the system relatively easy.

A still further object of this invention is to provide an on-board load measuring system which is compact and light in weight so that the load capacity of the vehicle is not materially reduced.

These and other objects of the invention are accomplished by an on-board load measuring system installed on a vehicle having tandem rear wheels and a suspension system of the type including equalizing beams positioned at the sides of the vehicle, with the midpoint of the beams pivotally supporting the vehicle frame and the ends of the equalizing beams connected to tandem axles. Since the vehicle is supported through the equalizing beams, the equalizing beams bend in response to loading of the vehicle. The vehicle load is measured by installing a strain sensing transducer on each equalizing beam. The transducer provides an electrical indication of equalizer beam deformation corresponding to the vehicle load. A similar transducer is carried by the front axle to measure the load supported by the front wheels.

Each transducer includes a pair of spaced apart mounts carried by the respective equalizing beam or front axle such that deformations thereof change the distance between the mounts. A deformable member extends between the mounts, and strain sensing means are secured thereto. The strain sensing means provides an electrical signal corresponding to variations in the relative position between the mounts responsive to bending of the respective equalizing beam or front axle.

The electrical load signals are received by a load indicating circuit which displays in the cab the load, either on the front wheels or on the rear wheels, with respect to a preset maximum load point corresponding to the legal limit. This permits the operator to precisely determine his available load capacity as his load approaches the legal limit.

BRIEF DESCRIPTION OF THE DRAWINGS

FIG. 5 is a schematic showing the indicating circuit which receives and amplifies the transducer outputs and provides a visual load indication.

FIG. 6 is a graph showing the voltage and current at various points in the circuit of FIG. 5 plotted as a function of strain gauge differential output voltage.

FIGS. 7-9 show the installation of the transducer on an axle.

DETAILED DESCRIPTION OF THE INVENTION

Figure 1:
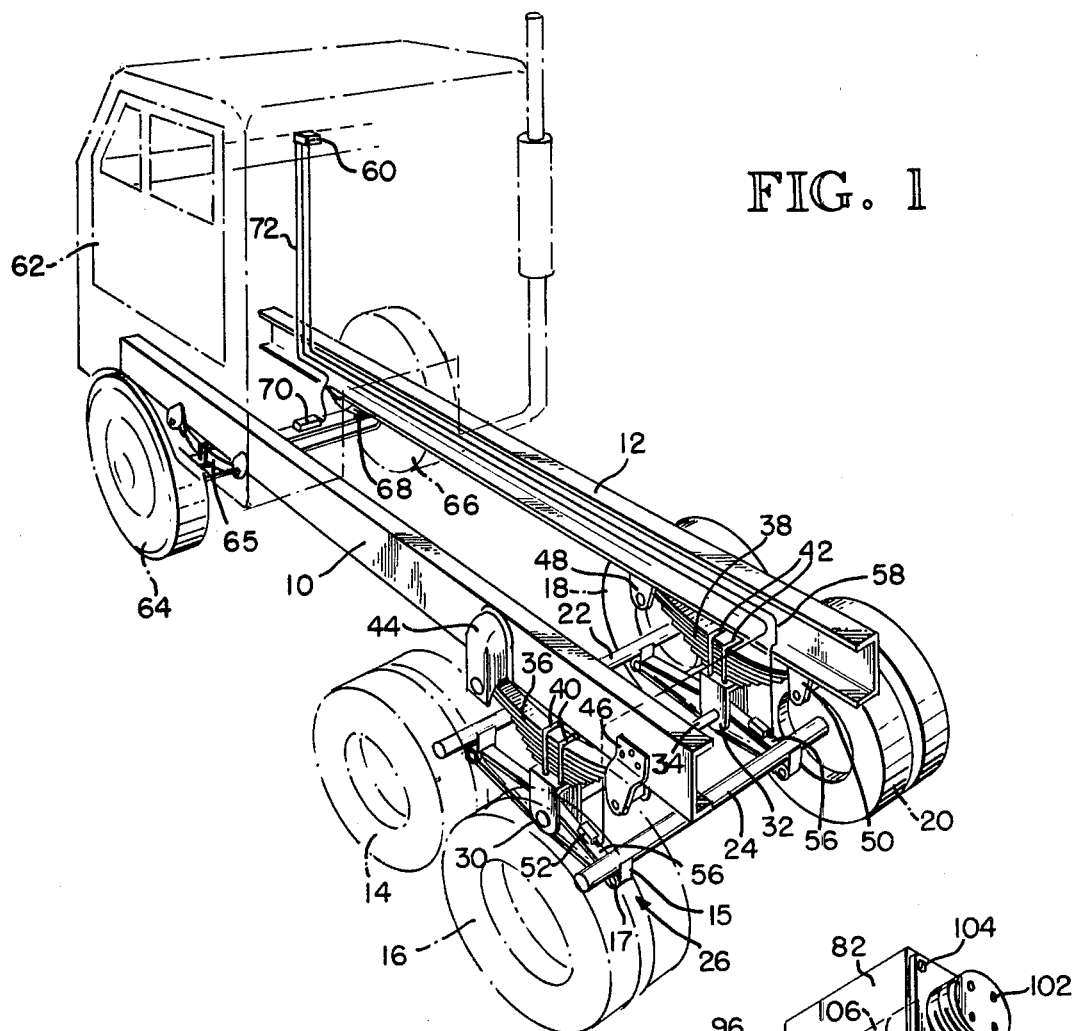
FIG. 1 is an isometric view showing a tandem-wheeled vehicle on which the inventive load measuring system is installed.

The on-board vehicle load measuring system of the present invention is shown in FIG. 1 installed on a vehicle having a pair of cross-connected longitudinal chassis frame members 10, 12 carried at the rear by a tandem-axle suspension system including fore and aft axle assemblies 22, 24 having sets 14, 16 and 18, 20 of dual wheels mounted on opposite ends thereof. The axle assemblies have forked, depending hanger brackets 15 fixed at their ends and pivotally connected at 17 in straddling relation to eyes formed at the ends of a pair of equalizing beams 26, 28 in the manner shown in U.S. Pat. No. 2,914,349. At their longitudinal center, these equalizing beams support a pair of saddles 30, 32 mounted on the ends of a cross-tube 34 in the manner shown in U.S. Pat. No. 3,129,016. Also as shown in this latter patent, pairs of U-bolts 40, 42 hold a pair of multi-leaf spring units 36, 38 seated on the flat upper face of the saddles 30, 32, and these springs are in turn connected by front and rear spring hangers 44, 48 and 46, 50 to the chassis frame member 10, 12. A typical such equalizing beam suspension system also includes front and rear torque rod assemblies (not shown) connected to the chassis frame and mounted on the center of the tandem axles 22, 24 as disclosed in the aforesaid patents.

The equalizing beams 26, 28 deflect responsive to loading of the vehicle so that the amount of deflection or bending is an indication of the loads placed on the tandem axles 22, 24. The on-board load measuring system of the present invention includes a pair of strain measuring transducers 52, 54 which are fastened respectively to the equalizing beams 26, 28 at a point preferably between the saddles 30, 32 and the rear tandem axle 24 and situated on the upper faces of the beams. Pairs of leads 56, 58 carry electrical indications of equalizing beam deformation generated by the transducers 52, 54 to a load indicator 60 mounted in the cab 62 of the vehicle.

The forward portions of the chassis frame members 10, 12 are supported by steerable front wheels 64, 66. These wheels 64, 66 are connected to a dead front axle 68 which is suspended by leaf spring units 65, and like the equalizing beams 26, 28, deflects or bends responsive to loading of the vehicle. A third strain measuring transducer 70 is secured to the front axle 68 for producing electrical indications of the bending thereof. A pair of leads 72 carry these electrical indications to the load indicator 60.

As will be explained hereinafter, the vehicle operator may monitor on the indicator 60 the load on either the forward or rear wheels of the vehicle. The vehicle load is not indicated in absolute terms, but rather the vehicle load is expressed in relation to a preset maximum load point. This system gives the operator a more precise indication of the load as the load approaches the legal limit, which is the zone where the operator is most concerned with the load on the vehicle.

Figure 2:
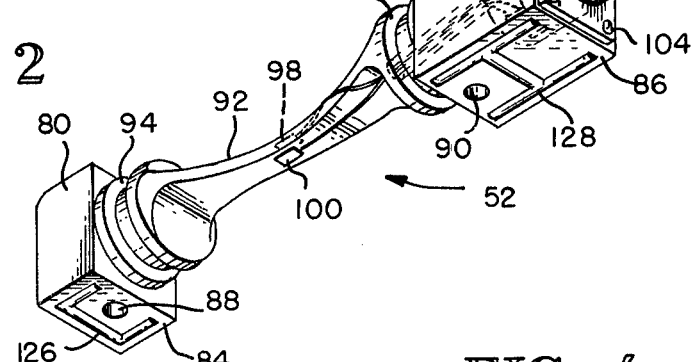
FIG. 2 is an isometric view of the strain sensing transducer.
Figure 3:
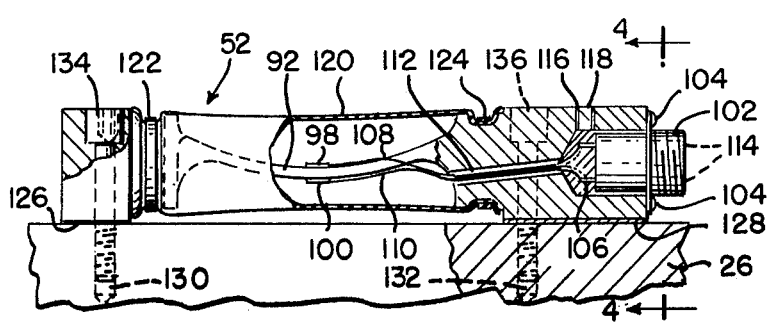
FIG. 3 is a side elevational view, partially in section, showing the transducer installed on the equalizing beam.
Figure 4:
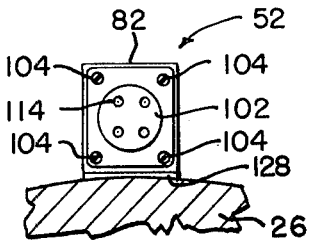
FIG. 4 is a cross-sectional view taken along the line 4—4 of FIG. 3.

The transducer 52 is part of the present invention and is detailed in FIGS. 2 through 4. In these views, it is seen that the transducer includes a pair of mounts 80, 82 having coplanar, flat mounting surfaces 84, 86 and countersunk through-bores 88, 90 with their axes perpendicular to the plane of the mounting surfaces. Extending between the mounts 80, 82 is a bending beam 92 integrally connected to the sides of the mounts 80, 82 through cylindrical members 94, 96, which are circumferentially grooved. The bending beam 92, cylindrical members 94, 96, and mounts 80, 82 are machined as a unitary structure from a single block of metal which is preferably of the same general type as that from which the equalizing beam is fabricated on which the transducer 52 is to be mounted so that the thermal expansion characteristics of the bending beam and equalizing beam will be similar. A pair of strain gauges 98, 100 are secured to opposite faces of the bending beam 92. These gauges are of conventional design and are commercially available through Micromeasurements, Inc. of Romulus, Michigan.

The sizes of the mounts 80, 82 are not critical except that the mount 82 should be of sufficient size to accommodate a connector 102 to provide electrical communication between the leads 56 from the strain gauges 98, 100. As best illustrated in FIG. 3, the connector 102 is secured to the outer end face of the mount 82 by screws 104. The inside end of the connector 102 contains a number of terminals, generally indicated at 106, which are electrically connected to the strain gauges 98, 100 by leads 108, 110 extending from the terminals 106 to the bending beam 92 via through-bore 112. The outer cylindrical surface of the connector 102 is threaded for receiving a plug (not shown) containing a number of conductor pins which are received by four holes 114. These holes 114 are aligned with conductors which are connected to respective terminals 106 through internal conductors. When the plug mates with the connector 102, the leads 56 connected to the pins are electrically connected to the strain gauges 98, 100 through leads 108, 110, terminals 100 and the conductors internal to the connector 102 which terminate in the holes 114.

As best illustrated in FIG. 3, the mount 82 contains a pair of small through-bores 116, 118 communicating with the cylindrical recess receiving the connector 102. After the transducer has been assembled, a conventional potting material is injected through the aperture 116 to fill the cylindrical void. Air previously in the void escapes via through-bore 118. The bending beam 92 and strain gauges 98, 100 are protected from the external environment by a cylindrical rubber boot 120 which is tightly secured at its ends to the cylindrical members 94, 96 by bands 122, 124 seated in the circumferential grooves in the members. Boot 120 is placed in position by radially stretching it over the mount 80 and pulling it endwise into shielding position.

The transducer 52 is installed on the equalizing beam 26 by first applying putty 126, 128 to the mounting surfaces 84, 86, preferably in a U-pattern and H-pattern, respectively, as shown in FIG. 2. The putty 126, 128 is not applied adjacent the inside edges of the mounting surfaces 84, 86 since, after the transducer 52 is installed on the equalizing beam 26, it is difficult to wipe excess putty therefrom. Similarly, the putty is not applied to the mounting surface 86 adjacent its outside edge since putty at this location might exert a bending force on the transducer 52. The putty 126, 128 is not applied for the purpose of bonding the transducer 52 to the equalizing beam 26, but instead it is used to provide a flat supporting surface for the transducer 52 on the top of the equalizing beam which, as illustrated in FIG. 4, is somewhat rounded. When the transducer 52 is forced against the equalizing beam 26, the putty 126, 128 spreads out to form a platform for the transducer. It is preferred that the thermal expansion characteristics of the putty closely match those of the equalizing beam and the transducer. Thus, for aluminum equalizing beams, an aluminum putty is used, while steel putty is used for steel equalizing beams. The putty is a well-known, commercially available product and may be obtained from the Devcon Company. A release agent may be applied to the mounting surfaces 84, 86 prior to application of the putty to facilitate subsequent removal of the transducer from the equalizing beam with the putty platform left intact for reuse.

As best illustrated in FIG. 3, shallow, spaced apart holes 130, 132 are bored into the equalizing beam 26 and then tapped with screw threads. These holes are preferably located in a zone of the beam offset from the longitudinal center wherein the stress laminate differential under load at the holes is minimal. Care should be taken to avoid boring too deeply into the equalizing beam 26 to avoid impairing its strength. Screws 134, 136 are inserted into the through-bores 88, 90, and the transducer 52 is torqued against the equalizing beam 26, thereby spreading the putty 126, 128. It is preferred to locate the transducer 52 on the rear upper surface of the equalizing beam so as to make it less vulnerable to flying objects, but this is not essential for performance since normally a protective cover is mounted over the transducer 52 to protect it from being struck by hard objects.

In its relaxed condition, the bending beam 92 of the transducer 52 is precurved, as best illustrated in FIG. 3. Thus the beam 92 is biased to bend in a predetermined direction for a given deflection of the equalizing beam 26. For example, as additional load is applied to the vehicle, the equalizing beam 26 undergoes increased bending. The increased bending causes the mounts 80, 82 to angle toward each other, thereby decreasing the distance from one mount to the other. Because the bending beam 92 is precurved, its radius of curvature decreases in response to the decrease in distance between the mounts 80, 82. A non-curved beam would also bend in response to load, but it would not be possible to predict in which direction the beam would bend. In such an instance, although one strain gauge would undergo tension and the other strain gauge would undergo compression, it would not be possible to predict which gauge would be tensioned and which would be compressed. However, in the case of the strain sensing transducer 52, the beam always bends such that the strain gauge 98 undergoes compression and the strain gauge 100 undergoes tension. The result is a transducer with pre-defined characteristics.

As indicated in FIG. 1, a transducer 70 which is identical to the transducer 52 is installed on the front axle 68. With reference to FIGS. 7 through 9, in preparation for this installation, a pair of mounting pads 140, 142 are initially secured to a spacer 144 by bolts 146, 148 which are screwed into vertical threaded bores provided in the top of the pads 140, 142. The holes in the spacer 144 through which the bolts 146, 148 extend are spaced apart a distance equal to the spacing between the through-bores 88, 90 (FIG. 2) when the transducer is in its relaxed condition. The pads 140, 142 are then secured to the front axle 68, preferably by welding at 150, 152, and the spacer 144 is removed from the pads by disengaging the bolts 146, 148 therefrom. The transducer 70 is then secured to the pads 140, 142 in place of the spacer 144. For this purpose, bolts 154, 156 are inserted through the bores in the transducer mounts and securely tightened. The described installation procedure insures proper bolt alignment. Finally, a U-shaped cover 158 is fastened to the mounting pads 140, 142 to protect the transducer 70. For this purpose, both sides of the cover 158 contain apertures 160 adapted to align with threaded bores 162, 164 in the sides of the mounting pads 140, 142. Cap screws 166 are inserted through washers 168, 170 and apertures 160 to engage the threads in bores 162, 164. An identical cover securing arrangement is provided on the reverse side of the cover 158.

The load indicator circuitry receiving the transducer outputs and providing a visual indication of vehicle load is illustrated in FIG. 5. Each of the strain gauges in the transducers 52, 54, 70 has a nominal resistance of 350 ohms and, in normal operation, this resistance can be expected to vary less than 1 ohm as the gauges undergo strain. The strain gauges 200, 202 in the front transducer 70 form, along with equal valued, matched resistors 204, 206, a Wheatstone bridge circuit having 8 volts applied thereto on line 208. The 1 ohm resistance variations of the strain gauges 200, 202 produce a maximum voltage variation on output line 210 of approximately 8 millivolts. Since the signal variations are relatively small, the 8 volt power is well regulated by a conventional voltage regulator (not shown). The resistors 204, 206 forming the passive legs of the bridge are matched to each other and to the strain gauge 200, 202 to insure good thermal stability.

The differential outputs 210, 212 of the bridge are applied through resistors 214, 216 to a double-pole, double-throw switch 218 which selectively transmits the outputs to the remainder of the indicator circuit. Strain gauge 200, being located on the upper surface of transducer 70, undergoes compression, while strain gauge 202, being located on the lower surface, undergoes tension. Thus, in response to increasing loads, the resistance of strain gauge 200 decreases, while the resistance of strain gauge 202 increases, thereby increasing the voltage on output line 210. The voltage on line 212, however, is a constant 4 volts and serves as a reference to which the output on line 210 is compared.

The strain gauges 98, 100 and 220, 222 in transducers 52, 54, respectively, form a second Wheatstone bridge powered by the regulated 8 volt power supply through line 224. The resistance of compression strain gauges 98, 222 decreases and the resistance of tension strain gauges 100, 220 increases in response to increased loading, thereby increasing the voltage on output line 226 and decreasing the voltage on output line 228 (i.e., increasing the differential output voltage). The outputs 226, 228 are connected to the double-pole, double-throw switch 218 through resistors 230, 232.

As will be explained hereinafter, the indicator circuit indicates vehicle loading only when the signal applied thereto, as selected by the double-pole, double-throw switch 218, approaches a predetermined voltage. This voltage is a composite of a bridge output voltage and an adjustable bias voltage. The bias voltages are applied through lines 234, 236 and resistors 238, 240 to the switch 218. The values of the bias voltage are determined by adjusting the wiper position of potentiometers 242, 244 between 8 volts and ground. The bias voltages, by determining the vehicle load at which the indicator circuit responds to the transducers, determine the vehicle load corresponding to a maximum load. The bias voltage is adjusted to preset the maximum load limit to correspond to the legal load limit for the front and rear wheels.

The outputs from the bridge selected by the switch 218 are applied to a high-gain operational amplifier 250. A pair of diodes 252, 254, arranged in parallel, anode to cathode, are placed across the input terminals to protect the amplifier 250 from excessive voltage inadvertently placed on the input lines. A capacitor 256 is also placed across the input terminals to reduce the high-frequency response of the amplifier 250. As explained below, a non-linear feedback circuit provides the response curve A shown in FIG. 6. When the differential input to the amplifier 250 is below a predetermined voltage, the $V_A$ output is clamped to approximately 3.3 volts, or a 1 diode drop below the voltage (approximately 4 volts) on the inverting input terminal, through diode 258. As the differential input voltage increases to $V_A$, diode 258 becomes back-biased, thereby opening the feedback path and causing the amplifier gain to greatly increase so that the output rises to approximately 4.7 volts, the point where diode 260 becomes forward-biased. Conduction through diode 260 closes the feedback path through resistor 262 and capacitor 264, arranged in parallel. In this condition, the gain of the amplifier 250 is approximately equal to the resistance 262 divided by the input resistance 216 or 232 plus the source resistance of the respective bridge. In one operational embodiment, this ratio was selected to be approximately 150.

Capacitor 264 is provided to roll off the gain of the amplifier 250 above a predetermined frequency so that the indicating circuit does not respond to motion-induced deflections of the equalizing beams or front axle. A frequency breakpoint of considerably less than 1 Hz is generally desired. The output of amplifier 250 is applied to another operational amplifier 266 through diode 260 and a resistor 268. The non-inverting input to amplifier 266 is connected to the non-inverting input to amplifier 250 through resistor 270. The voltage at the non-inverting input to amplifier 266 is approximately 4 volts. Thus, when the output voltage of amplifier 250 is below 4.7 volts, diode 260 is back-biased, holding the differential input voltage to amplifier 266 at zero volts and hence holding the output voltage to approximately 4 volts. In this condition, no current flows through a milliameter 272 connected between the summing junction of amplifier 266 and the output through resistor 274 since the voltage at the summing junction is also 4 volts. As the output of amplifier 250 rises above 4.7 volts, diode 260 becomes forward biased, causing current to flow into the summing junction of amplifier 266, thereby linearly reducing the output voltage of amplifier 266 as shown in curve B of FIG. 6. Current then flows through meter 272 in proportion to the increased voltage at the output of amplifier 250 as shown by curve C in FIG. 6. A shunting resistor 276 is placed in parallel with the meter 272.

The differential voltage $V_A$, at which the meter starts to deflect, may be varied by adjusting the load limit adjusting potentiometers 242, 244. In operation, the system is calibrated by placing a load on a truck which is measured by a conventional external vehicle weighing device to be the legal load limit. The switch 218 is then placed in its front transducer reading position, and the front load limit adjusting potentiometer 242 is set so that the meter 272 corresponds to a value indicating the maximum allowable load. The switch 218 is then placed in its rear load measuring position, and potentiometer 244 is adjusted so that the meter 272 indicates the maximum allowable load. When the vehicle is subsequently loaded, the meter remains undeflected until the vehicle load approaches the legal limit. As the indicator then moves from graduation to graduation toward the maximum allowable load position responsive to further loading of the vehicle, the operator can readily determine the remaining load capacity.

From the foregoing description, it is seen that the vehicle load measuring system of the present invention is unusually accurate and easy to use. It is readily installed and, in operation, minimally reduces the vehicle's capacity. Further, its accuracy is substantially unaffected by external conditions, such as the interface between the wheels and the ground, and it is not effected by environmental factors such as temperature and moisture.

The embodiments of the invention in which a particular property or privilege is claimed are defined as follows:

1. A method of installing a transducer on a structural member, the transducer having a pair of parallel fastener means spaced apart a predetermined distance, said method comprising:
   providing a pair of mounting pads having a pair of fastener receiving means adapted to receive said pair of fastener means,
   detachably connecting a spacer to said pads with said pair of fastener receiving means spaced apart said predetermined distance,
   securing said spacer connected pads to said structural member,
   detaching said spacer from said pads, and
   mounting said transducer on said pads by engaging said pair of fastener means with said pair of fastener receiving means.

2. The method of claim 1 in which said pair of fastener receiving means comprises a threaded hole in each of said mounting pads and said pair of fastener means has threads matched with those in said holes.

3. The method of claim 2 in which said spacer has a pair of through-bores spaced apart said predetermined distance, and said step of detachably connecting a spacer to said pads comprises passing a pair of screws through said spacer through-bores and threading them into said threaded holes in the pads.

4. The method of claim 3 in which said fastener means of the transducer comprises a pair of parallel through-bores in the transducer spaced apart said predetermined distance and a pair of matching screws in said transducer through-bores, and in which said step of mounting said transducer on said pads comprises screwing said matching screws into said threaded holes in the pads.

* * * * *